C. A. ROOT.
CROSSCUT-SAW HANDLES.
No. 194,052. Patented Aug. 14, 1877.
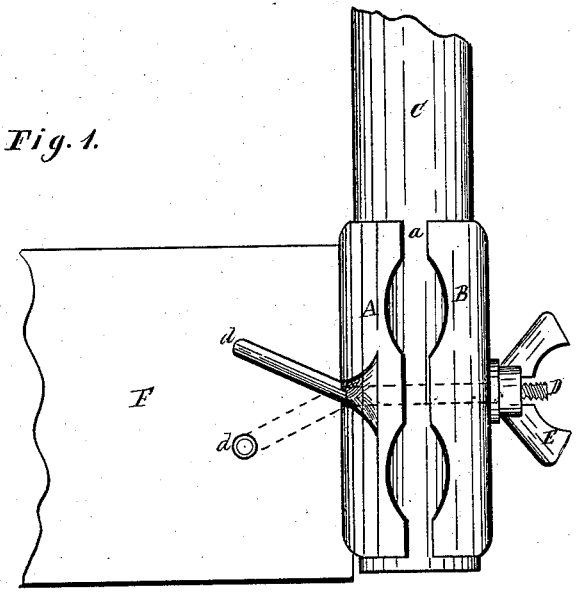
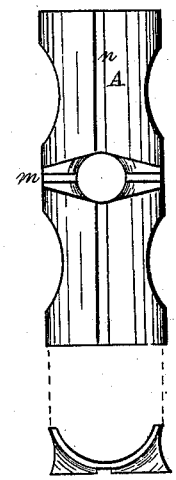
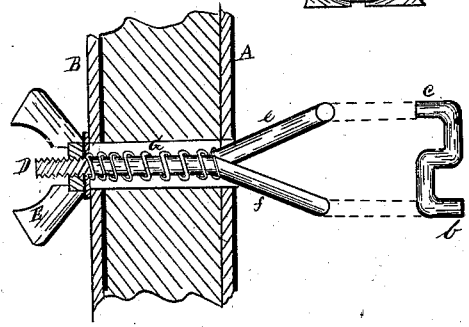
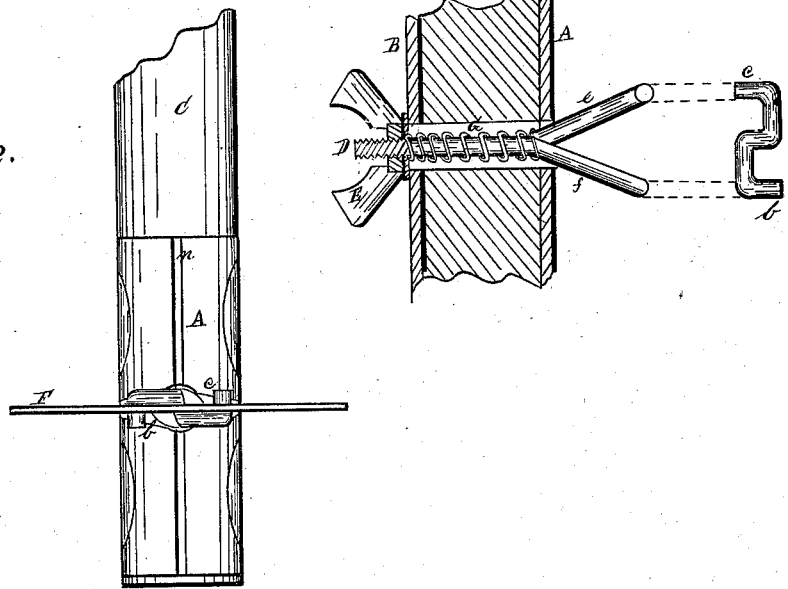
Witnesses. Inventor.

UNITED STATES PATENT OFFICE.

CORYDON A. ROOT, OF ANDOVER, OHIO, ASSIGNOR OF ONE-HALF HIS RIGHT TO LUCIUS W. MERRELL, OF SAME PLACE.

IMPROVEMENT IN CROSSCUT-SAW HANDLES.

Specification forming part of Letters Patent No. 194,052, dated August 14, 1877; application filed May 11, 1877.

*To all whom it may concern:*

Be it known that I, CORYDON A. ROOT, of Andover, in the county of Ashtabula and State of Ohio, have invented new and useful Improvements in Crosscut-Saw Handles, of which the following is a description, reference being had to the accompanying drawings, making a part of this specification, in which—

Figure 1 is a view of the handle attached to a section of the saw, so that the sides of the saw are in direction of the handle. Fig. 2 is a view of the handle attached to a section of a saw so as to be at right angles to the sides thereof. Fig. 3 is a detached section. Fig. 4 is a longitudinal transverse section of the handle, showing a bifurcated hook passing through it and a spring within the same.

Like letters of reference refer to like parts in the views presented.

This invention is a device for attaching a handle to a crosscut-saw so that said handle may be used either at right angles to the sides of the saw or in a right line therewith, by means of a clamp and certain other devices constructed and operated substantially as follows:

The device above referred to consists of a clamp, composed of sections A and B, which are of a semicircular character, as shown in Fig. 3, so that they may fit snugly the end of the handle C, Fig. 1, but which, when adjusted thereto, do not touch each other, there being a space, *a*, between them, as shown, to allow of their clamping the handle between them by the bolt and nut D and E. One end of said bolt is bifurcated, as shown in Fig. 4, the end of each arm of which is turned at right angles, forming a hook, *b* and *c*, Fig. 4.

The application of the above-described device to the saw will be readily understood on examination of the drawings, in which F represents the saw or a section of a saw. At the points *d* therein are made holes adapted to receive the ends or hooks *c* and *b* of the arms *e* and *f* of the bolt, between which arms the saw is placed, so that an arm is on either side of the saw, and having the turned ends or hooks respectively inserted in the holes *d d*, as shown in Fig. 1.

The end of the saw is lodged in a groove, *n*, Fig. 2, which is thereby prevented from turning, and which is retained therein by the bolt drawn into the handle by the nut E, and at the same time drawing the end of the saw hard into the groove. By this means the handle is firmly attached to the saw, which, as shown in Fig. 1, is such as is in ordinary use for cross-cutting logs.

In the event of its being necessary to use the saw flatwise in respect to the handle, as shown in Fig. 2, the handle can be thus adjusted by slackening the nut E so much as to allow the end of the saw to slip from the groove *n*. The saw can then be turned flatwise to the handle, as shown in said Fig. 2. A transverse groove, *m*, receives the end of the saw, which is therein retained and prevented from turning by the nut E.

The cutting-edge of the saw may be reversed from its position (shown in Fig. 1) so that the lower or cutting edge may be at the top, and the handle consequently below the cutting-edge.

The purpose of the spring G is to force the bifurcated end of the bolt forward to release the end of the saw from the grooves. The spring, however, is not an essential element in this invention, and, therefore, may be used either with or without it.

What I claim as my invention, and desire to secure by Letters Patent, is—

1. The clamp-plates or sections A and B, provided with the longitudinal and transverse grooves *m* and *n*, as and for the purpose specified.

2. In combination with the bifurcated bolt D and nut, sections A and B, handle C, and saw F, the spring G, for the purpose set forth.

3. The adjustable saw-handle herein described, consisting of section or clamp plates A B, provided with the transverse and longitudinal grooves *m n*, bifurcated bolt D and nut, in combination with the saw, constructed to operate in the manner substantially as set forth, and for the purpose specified.

CORYDON A. ROOT.

Witnesses:
W. H. BURRIDGE,
J. H. BURRIDGE.